United States Patent
Garcia Martin et al.

(10) Patent No.: US 11,252,651 B2
(45) Date of Patent: Feb. 15, 2022

(54) NETWORK SLICE SELECTION

(71) Applicant: Telefonaktiebolaget LM Ericsson (publ), Stockholm (SE)

(72) Inventors: Miguel Angel Garcia Martin, Pozuelo de Alarcon (ES); Pablo Martinez de la Cruz, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 28 days.

(21) Appl. No.: 16/611,771

(22) PCT Filed: May 8, 2017

(86) PCT No.: PCT/IB2017/000590
§ 371 (c)(1),
(2) Date: Nov. 7, 2019

(87) PCT Pub. No.: WO2018/206989
PCT Pub. Date: Nov. 15, 2018

(65) Prior Publication Data
US 2021/0153110 A1  May 20, 2021

(51) Int. Cl.
| | | |
|---|---|---|
| *H04W 48/18* | (2009.01) | |
| *H04L 29/08* | (2006.01) | |
| *H04W 48/16* | (2009.01) | |
| *H04W 84/04* | (2009.01) | |

(52) U.S. Cl.
CPC ......... *H04W 48/18* (2013.01); *H04L 67/2842* (2013.01); *H04W 48/16* (2013.01); *H04W 84/042* (2013.01)

(58) Field of Classification Search
CPC .... H04W 48/18; H04W 48/20; H04W 84/042
See application file for complete search history.

(56) References Cited

U.S. PATENT DOCUMENTS 10,863,556 B2 * 12/2020 Lau ..................... H04W 76/11
2017/0064029 A1 *  3/2017 Das ..................... H04W 4/18
(Continued)

OTHER PUBLICATIONS

3GPP TR 23.799 v14.0.0; Technical Report; 3rd Generation Partnership Project; Technical Specification Group Services and System Aspects; Study on Architecture for Next Generation System (Release 14)—Dec. 2016.
(Continued)

*Primary Examiner* — Qutbuddin Ghulamali
(74) *Attorney, Agent, or Firm* — Baker Botts, LLP

(57) ABSTRACT

Methods and systems are provided for selecting a network slice to which a User Equipment (UE) can connect in the telecommunications network. A Cache Inventory Repository (CIR) stores cache associations indicating content cached at each of a plurality of Cache Network Functions (Cache NFs) and the network slice in which each Cache NR is located. A Network Slice Selection Function (NSSF) transmits to the CIR a request for cache data indicating a particular content cached in one or more network slices. The CIR determines the requested cache data based on the stored cache associations and transmits the requested cache data to the NSSF. The NSSF selects a network slice to which the UE can connect, based at least in part on the received cache data identifying the one or more network slices.

11 Claims, 7 Drawing Sheets

(56) References Cited

U.S. PATENT DOCUMENTS

2019/0239156 A1* 8/2019 Wang .................. H04W 76/12
2019/0364492 A1* 11/2019 Azizi ................ H04W 52/0264

OTHER PUBLICATIONS

3GPP TSG RAN WG3 Meeting #92; Nanjing, China; Source: ZTE; Title: Network Slice Selection Procedure (R3-161107)—May 23-27, 2016.

3GPP TSG-SA WG1 Meeting #71; Belgrade, Serbia; Title: Network slicing—service/traffic dependent selection Source: NTT DoCoMo (S1-152427, revision of S1-152156)—Aug. 17-21, 2015.

SA WG2 Meeting #116; Vienna, Austria; Source: China Mobile, CATT, CATR; Title: Network slicing selection solution based on Slice Instance ID (S2-163979, revision of S2-163344)—Jul. 11-15, 2016.

PCT International Search Report for International application No. PCT/IB2017/000590—dated Oct. 4, 2017.

Service-Based Slice Selection Function for 5G by Malla Reddy Sama et al.—Oct. 2017.

PCT Written Opinion of the International Searching Authority for International application No. PCT/IB2017/000590—dated Oct. 4, 2017.

ETSI GS NGP 001 v1.1.1; Group Specification; Next Generation Protocols (NGP); Scenarios Definitions—Oct. 2016.

* cited by examiner

NETWORK SLICE SELECTION

PRIORITY

This nonprovisional application is a U.S. National Stage Filing under 35 U.S.C. § 371 of International Patent Application Serial No. PCT/IB2017/000590 filed May 8, 2017 and entitled "NETWORK SLICE SELECTION" which is hereby incorporated by reference in its entirety.

TECHNICAL FIELD

The invention relates to the selection of network slices in a telecommunications network for use by a User Equipment (UE).

BACKGROUND

In the context of Fifth Generation (5G) technologies, the Third Generation Partnership Project (3GPP) has created a document entitled Architecture for Next Generation Systems. Currently, this document is a technical report (3GPP TR 23.799 v14.0.0) where a number of key issues are being studied. 3GPP has the intention of transposing some of the agreed technical solutions to technical specifications.

In 3GPP TR 23.799, a key issue related to the support of network slicing in the next generation architecture has been identified. This key issue has listed a number of tasks that should be addressed in order to provide full support for network slicing. One of the identified tasks is the Network Slice Instance Selection and Association (task #1 in the key issue). This task, according to 3GPP TR 23.799 includes:
1) Initial network slice instance selection to support a UE's service establishment and re-selection to support UE mobility and other scenarios that are to be determined;
   (Note: More scenarios beyond the mobility need to be identified that may trigger network slice instance re-selection.)
2) Network slice instance identification;
3) Authorization for UE association with network slice instance; and
4) Network provided and UE provided assistance information support for network slice instance selection.

The UE provided assistance information support for network slice selection mentioned above may include a Usage Class parameter, as indicated in 3GPP TR 23.799 clause 6.1.7:

The Usage Class of a network slice indicates the use case that the network slice instance is configured to support, i.e. the type of the network slice instance.

3GPP TR 23.799 assumes a network function called the Network Slice Selection Function (NSSF), which according to such TR, handles the UE's initial Attach Request and New Session establishment request by selecting an appropriate slice for the UE based on the UE's subscription information, UE usage type, service type and UE capabilities. The NSSF is not specific to a particular network slice.

Additionally, 3GPP TR 23.799 assumes a number of Common Control Plane (CP) Functions, which are network functions that are shared across all network slices. There are also Slice Specific Network Functions. FIG. 1 shows an architecture diagram relating to network slice selection, according to 3GPP TR 23.799.

It is noted that the successor to 3GPP TR 23.799 is 3GPP TS 23.501. Currently, the latest version of 3GPP TS 23.501 is version 0.3.0, and does not comprise all the details already included in the 3GPP TR 23.799.

A problem with the existing solution is related to the fact that slice selection is performed based on limited data, such as user subscription information, UE usage type, service type, usage class, and UE capabilities. In particular, slice selection does not consider a number of factors that can be of utmost relevance for the network selection. The slice selection mechanism is not optimized for maximizing the user's experience. For example, the slice selection mechanism does not offer a solution for assigning a network slice that will minimize delay in getting required content from the network to the UE.

If a UE is entitled to use more than one network slice, for example one network slice might be optimized for Internet of Things (IoT) type of communications, another network slice might be optimized to serve video content, due to the existence of video optimization service functions, etc. and the UE, at any time, can access one or more of those network slices simultaneously.

At present, network slice selection is performed based on a limited number of data, such as user's subscription information, UE usage type, service type, Usage Class, and UE capabilities. In particular, where a UE is entitled to use more than one single network slice, and the network slices are specially optimized for different types of communications, or different types of contents, the NSSF may lack relevant information to select one or another network slice at a certain time for a UE.

SUMMARY

It is an aim of the invention to optimize the user experience when the network is performing slice selection by mitigating one or more of the above mentioned problems.

The inventors have appreciated that current mechanisms do not consider rapid access to content, in particular cached content, when selecting network slice(s) for use by a UE.

According to the invention in an aspect, there is provided a network node for use as a Network Slice Selection Function, NSSF, in a telecommunications network. The network node is configured to select a network slice to which a User Equipment, UE, can connect in the telecommunications network. The network node comprises a cache data requesting means, which may be a cache data requester, configured to control a transmitter to transmit to a Cache Inventory Repository, CIR, a request for cache data indicating a particular content cached in one or more network slices. The network node further comprises a receiving means, which may be a receiver, configured to receive a response from the CIR comprising the cache data identifying the one or more network slices in which the particular content is cached. The network node further comprises a network slice selecting means, which may be a network slice selector, configured to select a network slice to which the UE can connect, based at least in part on the received cache data identifying the one or more network slices.

Optionally, the network node, further comprises a content data managing means, which may be a content data manager, configured to determine the particular content based on historical content data for the UE.

Optionally, a content data manager is configured to determine the particular content based on current content data requested by the UE.

Optionally, the content data manager is further configured to trigger storage of the current content data for subsequent use as historical content data, the storage triggered in a local memory and/or an external database via the transmitter.

Optionally, the network node further comprises an access network managing means, which may be an access network manager, configured to control the transmitter to transmit a request for access network data to an Access Network Discovery and Selection Function, ANDSF, indicating one or more access networks in the vicinity of the UE, wherein the receiver is configured to receive the access network data from the ANDSF, the access network manager being further configured to select an access network from the indicated one or more access networks based at least in part on the particular content.

Optionally, the access network manager is further configured to transmit a message to the ANDSF instructing it to effect connection of the UE to the selected access network.

Optionally, the receiver is further configured to: receive from an access network node, a request for a network slice for use with a UE, and wherein the network slice selector is further configured to transmit a message to the access network node instructing the access network to connect the UE to the selected network slice.

According to the invention in an aspect, there is provided a method for operating a network node for use as a Network Slice Selection Function, NSSF, in a telecommunications network, the network node being configured to select a network slice to which a User Equipment, UE, can connect in the telecommunications network. The method comprises a cache data requester, controlling a transmitter, to transmit to a Cache Inventory Repository, CIR, a request for cache data indicating a particular content cached in one or more network slices. The method further comprises receiving, by a receiver, a response from the CIR comprising the cache data identifying the one or more network slices in which the particular content is cached. The method further comprises selecting, by a network slice selector, a network slice to which the UE can connect, based at least in part on the received cache data identifying the one or more network slices.

Optionally, the method further comprises a content data manager determining the particular content based on historical content data for the UE.

Optionally, the method further comprises a content data manager determining the particular content based on current content data requested by the UE.

Optionally, the method further comprises the content data manager triggering storage of the current content data for subsequent use as historical content data, the storage triggered in a local memory and/or an external database via the transmitter.

Optionally, the method further comprises an access network manager controlling the transmitter to transmit a request for access network data to an Access Network Discovery and Selection Function, ANDSF, indicating one or more access networks in the vicinity of the UE, receiving, by the receiver, the access network data from the ANDSF, selecting, by the access network manager, an access network from the indicated one or more access networks based at least in part on the particular content.

Optionally, the method further comprises the access network manager transmitting a message to the ANDSF instructing it to effect connection of the UE to the selected access network.

Optionally, the method further comprises the receiver receiving from an access network node, a request for a network slice for use with a UE, and the network slice selector transmitting a message to the access network node instructing the access network to connect the UE to the selected network slice.

According to the invention in an aspect, there is provided a network node for use as a Cache Inventory Repository, CIR, for use in a telecommunications network. The network node comprises a receiving means, which may be a receiver, configured to receive content data from a plurality of Cache Network Functions, Cache NFs, located in a plurality of network slices of the telecommunications network. The network node comprises a content data controlling means, which may be a content data controller, configured, based on the received content data, to store cache associations indicating content cached at each Cache NF and the network slice in which each Cache NF is located. The receiver is further configured to receive from a Network Slice Selection Function, NSSF, a request for cache data indicating a particular content cached in one or more network slices. The content data controller is further configured to determine the requested cache data based on the stored cache associations, the requested cache data comprising at least one of: one or more Cache NFs and one or more network slices caching the particular content, and control a transmitter to transmit the requested cache data to the NSSF.

According to the invention in an aspect, there is provided a method for operating a network node for use as a Cache Inventory Repository, CIR, for use in a telecommunications network. The method comprises receiving, by a receiver, content data from a plurality of Cache Network Functions, Cache NFs, located in a plurality of network slices of the telecommunications network. The method further comprises storing, by a content data controller, cache associations based on the received content data, wherein the cache associations indicate content cached at each Cache NF and the network slice in which each Cache NF is located. The method further comprises receiving, by the receiver and from a Network Slice Selection Function, NSSF, a request for cache data that indicates a particular content cached in one or more network slices. The method further comprises determining, by the content data controller, the requested cache data based on the stored cache associations, the requested cache data comprising at least one of: one or more Cache NFs and one or more network slices caching the particular content. The method further comprises the content data controller controlling a transmitter to transmit the requested cache data to the NSSF.

According to the invention in an aspect, there is provided a network node for use as a Cache Network Function, Cache NF, located in a network slice of a telecommunications network. The Cache NF comprises a cached content managing means, which may be a cached content manager, configured to monitor content cached at the Cache NF, and further configured to control a transmitter to transmit toward a Cache Inventory Repository, CIR, content data identifying at least one of the Cache NF and the network slice in which the Cache NF is located, and indicating the content cached at the Cache NF.

According to the invention in an aspect, there is provided a method for operating a network node for use as a Cache Network Function, Cache NF, located in a network slice of a telecommunications network. The method comprises monitoring, by a cached content manager, content cached at the Cache NF. The method further comprises controlling, by the cached content manager, a transmitter to transmit toward a Cache Inventory Repository, CIR, content data identifying at least one of the Cache NF and the network slice in which the Cache NF is located, and indicating the content cached at the Cache NF.

According to the invention in an aspect, there is provided a computer program comprising instructions which, when executed on at least one processor, cause the at least one processor to carry out any method disclosed herein.

According to the invention in an aspect, there is provided a carrier containing the computer program mentioned above, wherein the carrier is one of an electronic signal, optical signal, radio signal, or non-transitory computer readable storage medium.

DETAILED DESCRIPTION

Generally, disclosed herein are methods and apparatus for selecting network slices based on access to particular content by a UE. Exemplary methods and apparatus comprise means to determine content that a UE might need access to, determine one or more network slices caching that determined content and select an appropriate network slice based on those determinations.

Each network slice implements one or more cache functions. Each of the cache functions might be caching some content, which may be different from content cached by other cache functions located in other slices. For example, a first cache function might be caching all the content produced by one particular newspaper and a second cache function, possibly operated by a different provider than the first cache function, might be caching all the content produced by a second newspaper.

In exemplary networks, the cache functions operated or provided by different cache operators are accessible from either a given network slice, a given access network, or a combination thereof. These specialized cache functions can be implemented in certain network slices but not in every network slice and there is therefore not a deterministic rule to identify which network slice implements which cache function. Therefore, it is difficult to get a priori knowledge of which network slice is the most suitable for the user at a given point in time.

In exemplary architectures, the NSSF considers the actual content that the user is trying to access as an input for determining the access network and for network slice selection. However, some problems arise, for example:

a) How does the NSSF become aware of the actual content that the user is trying to access?
b) If a suitable cache function is available within a given network slice, how can the NSSF influence network slice selection so that such network slice is favored?
c) How does the NSSF get to know which cache function is implemented in which network slice?

In exemplary arrangements, Cache Network Functions (Cache NFs) are deployed in one or more network slices. Each of these Cache NFs is effectively a content storage and delivery function. User plane traffic may be routed through a Cache NF, so that if the content requested by the user is already cached in it, the content is served from the Cache NF. Additionally, a Cache NF manages the content that is cached. These Cache NFs are a specific NF implemented in the network slice.

The architecture is enhanced with a novel network node, herein called a Cache Inventory Repository (CIR), which is included as part of the Common Control Plane (CP) Network Functions, which are shared by different network slices. The CIR interfaces each of the Cache NFs that are deployed in the different network slices.

Figure 1:
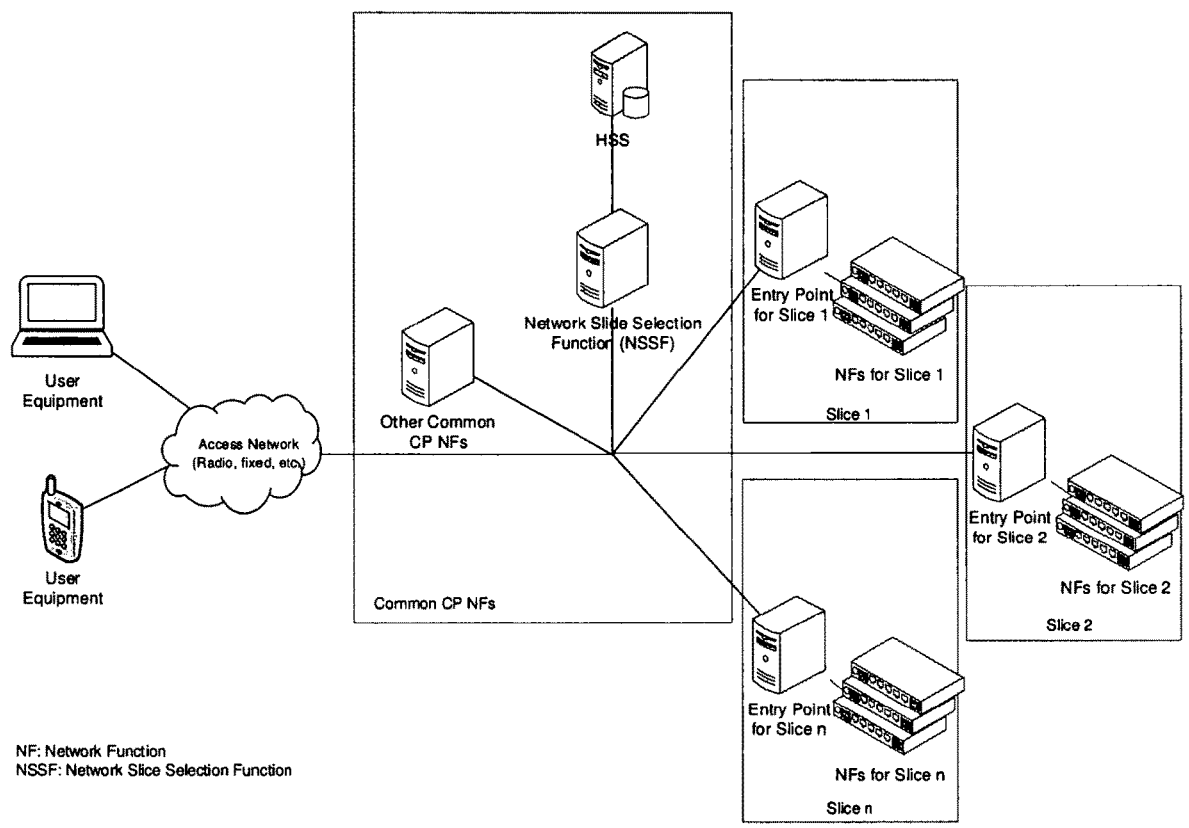
FIG. 1 is a schematic diagram of a telecommunications network.
Figure 2:
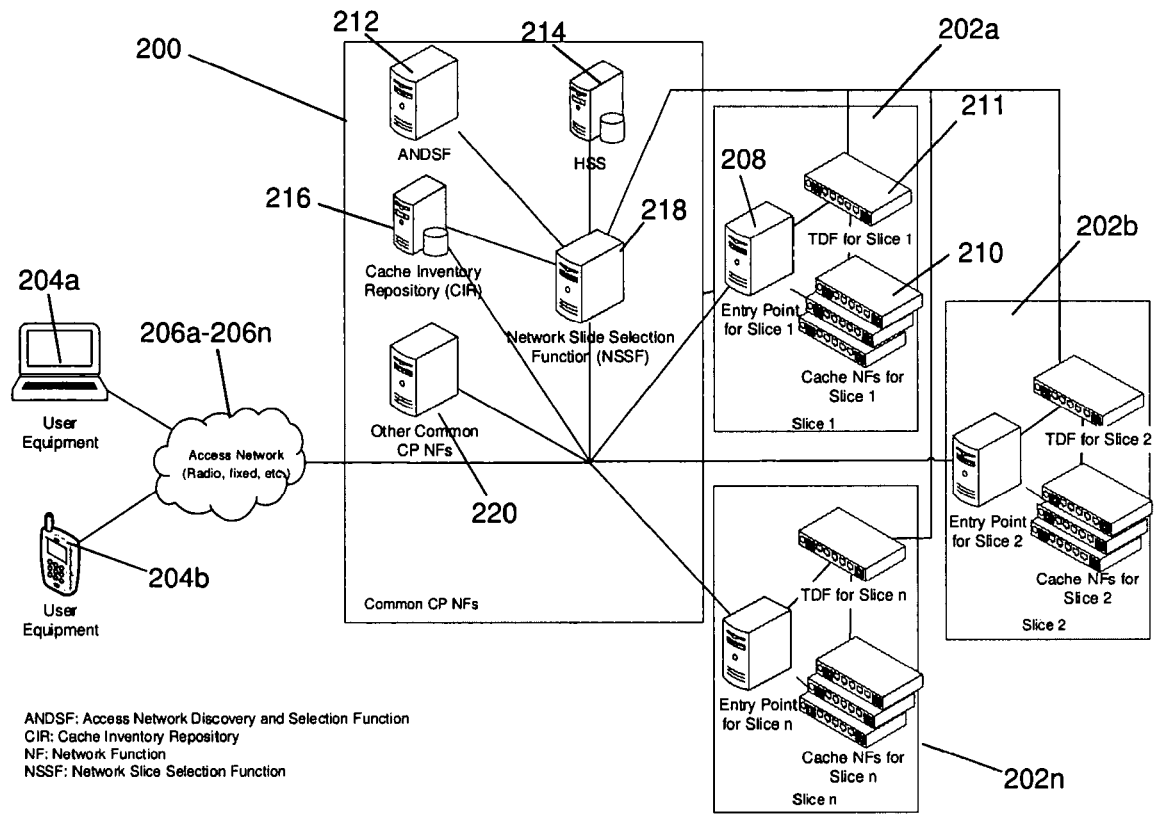
FIG. 2 is a schematic diagram of a telecommunications network.

FIG. 2 shows an exemplary network architecture for the implementation of network slices. The architecture comprises a CP 200, a plurality of network slices 202a-202n and one or more UEs 204a-204b configured to access the architecture via an access network 206a-206n. Access Networks can be of different types and natures, for example, a Radio Access Network (RAN) 206a or a WiFi access network 206n. Each network slice 202a-202n comprises an entry point 208, one or more Cache NFs 210 and a Traffic Detection Function (TDF) 211. The CP 200 comprises an Access Network Discovery and Selection Function (ANDSF) 212, a Home Subscriber Server 214, a CIR 216, an NSSF 218 and one or more other Common CP NFs 220. The UEs 204a-204b are configured to access the network slices 202a-202n via the CP 200.

In exemplary methods and apparatus and as explained in greater detail below, users may explicitly indicate the content they require access to, for example, they can indicate that they require access to video content produced by a certain news outlet. In other exemplary methods and apparatus, the network may analyse traffic originating from or directed to a UE 204a-204b and determine the type of content that is being requested based on that traffic. In any case, the NSSF 218 acquires information that indicates the content the user is requesting or is likely to request. The NSSF 218 may request information from the CIR 216 for determining the network slices that host the Cache NF that may store the requested content. The NSSF 218 may use this new information for determining the most advantageous network slice 202a-202n that is available for the combination of the user and the required content.

The NSSF 220 may also request the ANDSF 212 to push access network policies to the UE 204a-204b in order to force the selection of an advantageous access network 206a-206n according to the requested content and the selected network slice 202a-202n.

In exemplary methods and apparatus, the CIR 216 implements a process that performs continuous content metadata ingestion from available Cache NFs 210 in one or more of a plurality of network slices 202a-202n, in order to have an overview of the distributed cached content in each network slice 202a-202n. The CIR 216 is therefore able to determine a prioritized list of advantageous slices.

Methods and apparatus disclosed herein may provide a mechanism for selecting one or both of a network slice and an access network based on the content that the user is requesting. This may benefit the user, as they will receive the content from a localised cache, so the content is closer to the user and received much faster due to the lack of transport delays and bottlenecks.

The network operator may also benefit because, when an appropriate network slice is selected, the content is served from the cache, avoiding Internet Protocol (IP) transit fees (the fee that the network operator pays to the IP transit network for providing connectivity to the Internet): Additionally, the selection of an advantageous access network, according to the type of content, may avoid the user incurring extra costs related to the access network, e.g., in case a local access network (owned by the network operator) is selected.

In exemplary methods and apparatus, prior to executing a network slice selection procedure, the NSSF 218 may request information from the CIR 216 for associating network slices 202a-202n with Cache NFs 210 and their cached content. This means that the CIR 216 is able to build a table that maps this type of content. A potential realization of such table is presented in the table below.

| ID | Type of content | Source of content | Network Slice |
|---|---|---|---|
| 1 | Images | cnn.com, euronews.com | NS A: Default |
| 2 | Video | youtube.com | NS B: Video optimized |
| 3 | Images | img.youtube.com | NS B: Video optimized |
| 4 | Images, video, audio | .es | NS C: Optimized for Spanish content |

Figure 3:
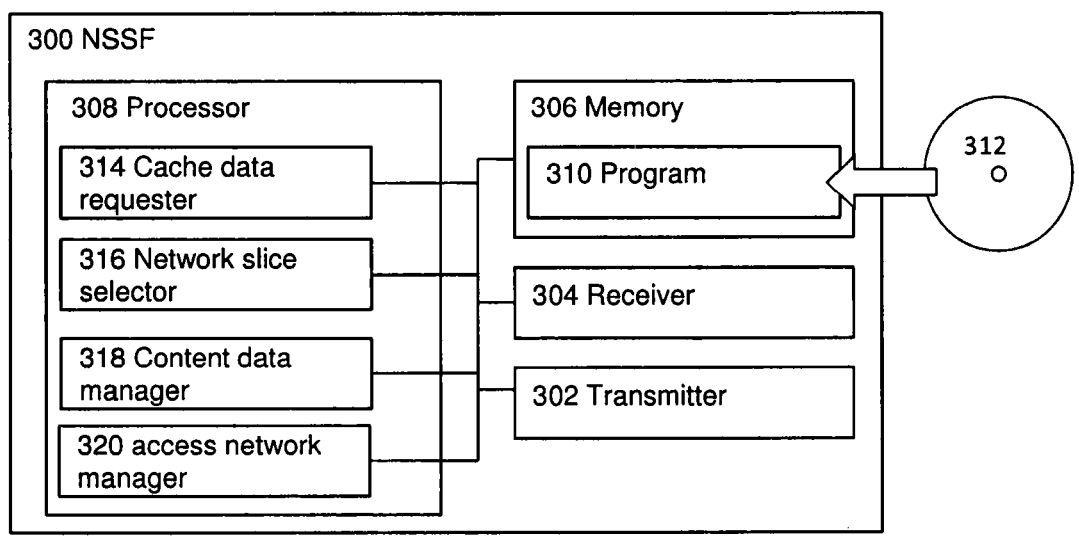
FIG. 3 is a block schematic diagram of a Network Slice Selection Function.

FIG. 3 shows a schematic representation of a network node for implementing an NSSF 300. The NSSF 300 may be an NSSF 218 of FIG. 2. The NSSF 300 comprises a transmitter 302 and a receiver 304. The transmitter 302 and receiver 304 may be in data communication with other network entities in a telecommunications network and are configured to transmit and receive data accordingly.

The NSSF 300 further comprises a memory 306 and a processor 308. The memory 306 may comprise a non-volatile memory and/or a volatile memory. The memory 306 may have a computer program 310 stored therein. The computer program 310 may be configured to undertake the methods disclosed herein. The computer program 310 may be loaded in the memory 306 from a non-transitory computer readable medium 312, on which the computer program is stored. The processor 308 is configured to undertake one or more of the functions of a cache data requester 314, a network slice selector 316, a content data manager 318 and an access network manager 320, as set out below.

Each of the transmitter 302 and receiver 304, memory 306, processor 308, cache data requester 314, network slice selector 316, content data manager 318 and access network manager 320 is in data communication with the other features 302, 304, 306, 308, 310, 314, 316, 318, 320 of the NSSF 300. The NSSF 300 can be implemented as a combination of computer hardware and software. In particular, the cache data requester 314, network slice selector 316, content data manager 318 and access network manager 320 may be implemented as software configured to run on the processor 308, or as combinations of hardware and software in separate modules. The memory 306 stores the various programs/executable files that are implemented by a processor 308, and also provides a storage unit for any required data, such as e.g. historical content data for a UE. The programs/executable files stored in the memory 306, and implemented by the processor 308, can include the cache data requester 314, network slice selector 316, content data manager 318 and access network manager 320, but are not limited to such.

Figure 4:
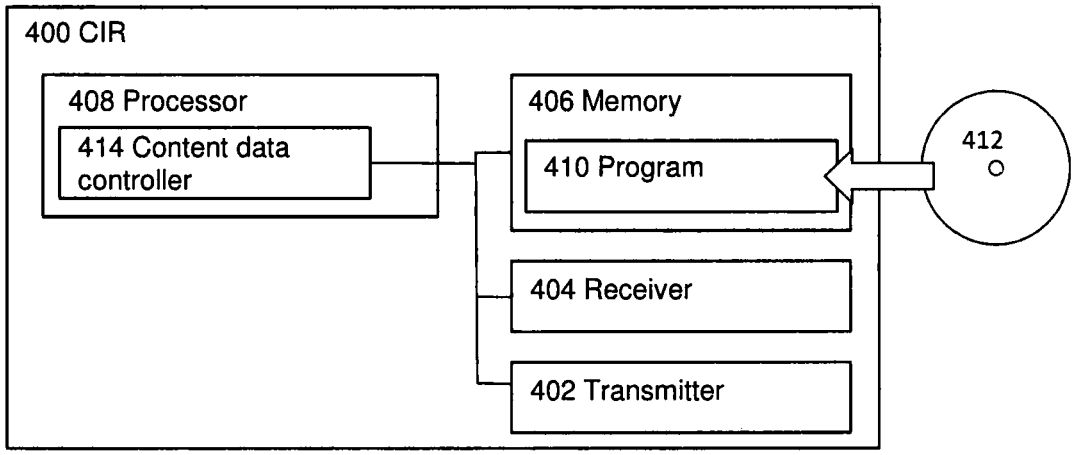
FIG. 4 is a block schematic diagram of a Cache Inventory Repository.

FIG. 4 shows a schematic representation of a network node for implementing a CIR 400. The CIR 400 may be a CIR 216 of FIG. 2. The CIR 400 comprises a transmitter 402 and a receiver 404. The transmitter 402 and receiver 404 may be in data communication with other network entities in a telecommunications network and are configured to transmit and receive data accordingly.

The CIR 400 further comprises a memory 406 and a processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake one or more of the functions of a content data controller 414, as set out below.

Each of the transmitter 402 and receiver 404, memory 406, processor 408 and content data controller 414 is in data communication with the other features 402, 404, 406, 408, 410, 414 of the CIR 400. The CIR 400 can be implemented as a combination of computer hardware and software. In particular, the content data controller 414 may be implemented as software configured to run on the processor 408, or as combinations of hardware and software in separate modules. The memory 406 stores the various programs/executable files that are implemented by a processor 408, and also provides a storage unit for any required data, such as e.g. associations indicating content cached at each Cache NF and the network slice in which each Cache NF is located. The programs/executable files stored in the memory 406, and implemented by the processor 408, can include the content data controller 414, but are not limited to such.

Figure 5:
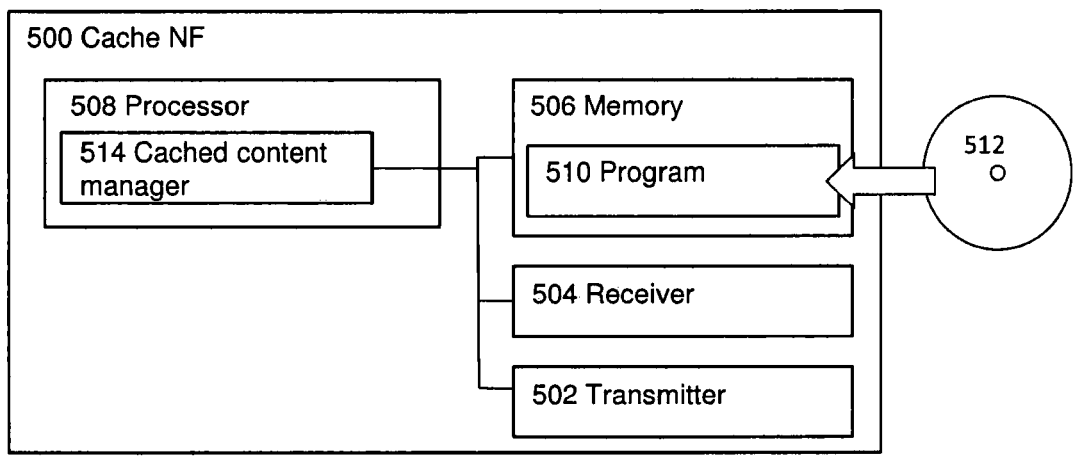
FIG. 5 is a block schematic diagram of a Cache Network Function.

FIG. 5 shows a schematic representation of a network node for implementing a Cache NF 500. The Cache NF 500 may be a Cache NF 210 of FIG. 2. The Cache NF 500 comprises a transmitter 502 and a receiver 504. The transmitter 502 and receiver 504 may be in data communication with other network entities in a telecommunications network and are configured to transmit and receive data accordingly.

The Cache NF 500 further comprises a memory 506 and a processor 508. The memory 506 may comprise a non-volatile memory and/or a volatile memory. The memory 506 may have a computer program 510 stored therein. The computer program 510 may be configured to undertake the methods disclosed herein. The computer program 510 may be loaded in the memory 506 from a non-transitory computer readable medium 512, on which the computer program is stored. The processor 508 is configured to undertake one or more of the functions of a cached content manager 514, as set out below.

Each of the transmitter 502 and receiver 504, memory 506, processor 508, cached content manager 514 is in data communication with the other features 502, 504, 506, 508, 510, 514 of the Cache NF 500. The Cache NF 500 can be implemented as a combination of computer hardware and software. In particular, the cached content manager 514 may be implemented as software configured to run on the processor 508, or as combinations of hardware and software in separate modules. The memory 506 stores the various programs/executable files that are implemented by a processor 508, and also provides a storage unit for any required data, such as e.g. cached content related data like pointers or indexes. The programs/executable files stored in the memory 506, and implemented by the processor 508, can include the cached content manager 514, but are not limited to such.

Figure 6:
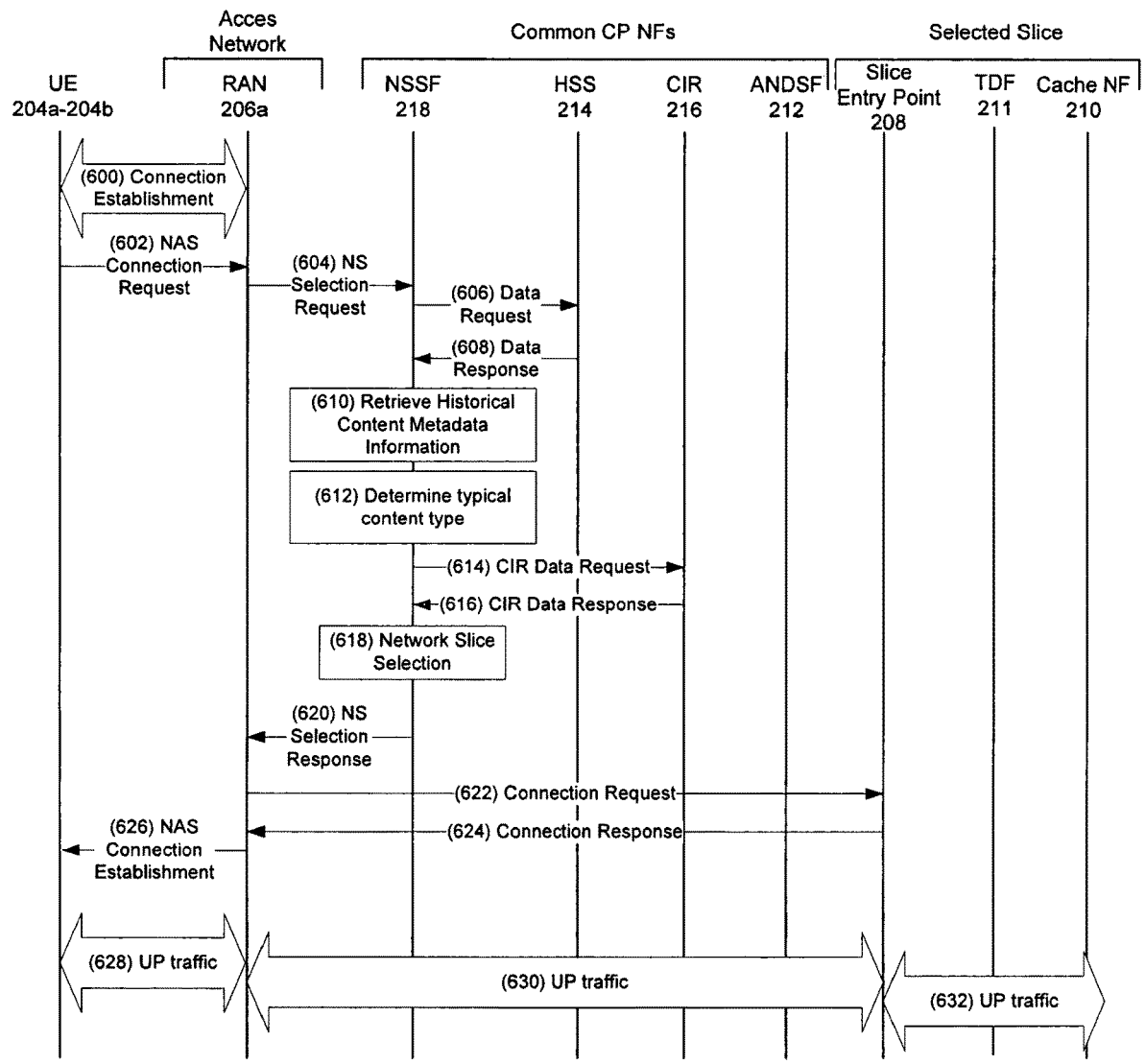
FIG. 6 is a signalling diagram showing a method for initial attachment of a UE to a telecommunications network.

FIG. 6 is an exemplary signalling diagram showing a method for initial attachment of a UE 204a-204b to a telecommunications network, wherein the initial attachment includes initial network slice selection.

Initial attachment to the network typically does not include a request for content from the user. Instead, initial attachment to the network is typically executed when the UE 204a-204b is booted, taken out of "Airplane mode" or otherwise needs to connect to a network. Since there is not specific content being requested by the user, the NSSF 218 uses historical data based on the previous content requested by the user of the UE 204a-204b, in order to select the best suitable network slice. Additionally, there is no access network 206a-206n selection process during the initial attachment, because the UE 204a-204b typically selects an access network 206a-206n according to existing policies stored at the UE 204a-204b.

According to FIG. 6, a UE 204a-204b executes 600 a Connection Establishment procedure towards the Radio Access Network (RAN) 206a. The UE 204a-204b thereby obtains initial connectivity from the RAN 206a.

The UE 204a-204b transmits 602 a network-attached storage (NAS) connection request towards the RAN 206a. The RAN 206a transmits 604 an NS Selection Request message to the NSSF 218. The NSSF 218 receives the NS Selection Request and, prior to selecting a network slice retrieves 606, 608 a user profile from the HSS 214. The information in the user profile received from the HSS 214 may include user subscription information, such as the set of network slices this user is authorized to connect to.

The content data manager 318 of the NSSF 218 retrieves 610 historical Content Metadata information pertaining to this user and determines a content type based on that data. This information might be locally stored at the NSSF 218 following previous connections of the user, in which case the content data manager 318 may query the locally stored data. Alternatively, the Content Metadata information may be located in an external database, such as the HSS 214, in which case the content data manager 318 may transmit a request for historical content metadata from the external database.

The historical Content Metadata information may indicate, based on observed subscribed events, the type of content that is typically retrieved by this user at certain periods of time, or at certain locations. The location of the user may be reported during the connection establishment procedure and may be periodically updated. For example, the historical Content Metadata information may indicate that the user has the following traffic records:

Working days between 9.00 am and 10.00 am: the majority of a the traffic is HTTP addressed to two major newspaper web sites;

Working days between 10.00 am and 3.00 pm: the majority of the traffic is music streaming from a popular online music platform;

Every day between 6.00 pm and 9.00 pm: the majority of the traffic is addressed to either a given video streaming platform or a popular social network; and/or Weekends and non-working days between 10.00 am and 8.00 pm: the majority of the traffic is addressed to a popular gaming platform.

The content data manager 318 of the NSSF 218 may then determine 612 the type of content that the user typically accesses in the context of this attach, in this example, considering the current time and day. This may comprise selecting the content that is typically accessed by this user according to the data retrieved in step 610. Continuing with the example above, if the current time is 11.00 am on a working day, the NSSF 218 determines that is likely that the user will be accessing a music streaming service from a popular online music platform.

The cache data requester 314 of the NSSF 218 transmits 614 a request for cache data to the CIR 216 for information indicating if there is a network slice 202a-202n that is caching content from content supplier that was determined in step 612 (i.e., the popular music streaming service in the example).

The content data controller 414 of the CIR 216 consults its internal database and determines the requested cache data based on cache associations indicating content cached at each Cache NF and the network slice in which each Cache NF is located. The content data controller 414 may create a list of network slices 202a-202n that includes one or more Cache NFs 210 that are caching, for example, the music streaming service. The content data controller 414 then transmits 616 the requested cache data, e.g. the list of network slices 202a-202n, to the NSSF 218.

With the information about authorized network slices for the user, received from the HSS 214 in step 608, and the list of network slices 202a-202n, received from the CIR 216 in step 616, the network slice selector 316 of the NSSF 218 determines 618 a network slice 202a-202n, which may be the optimal network slice 202a-202n, for this user and/or the type of predicted content and/or the time. Continuing with the example, the network slice selector 316 selects a favorable network slice 202a-202n (out of a plurality of them) that contains a Cache NF 210 that is known to be caching the popular music platform typically accessed by the user at this time.

The NSSF 218 transmits 620 a NS Selection Response to the RAN 206a indicating the selected network slice 202a-202n. The NS Selection Response serves as an acknowledgement of the NS Selection Request 604 message. The NS Selection Response message indicates detailed data of the network slice 202a-202n, such as the address of the Slice Entry Point 208.

Once the RAN 206a is informed of the selected network slice 202a-202n for this user, the RAN 206a transmits 622 a Connection Request to the Slice Entry Point 208 of the selected network slice 202a-202n that was received in step 620. The Slice Entry Point 208 accepts the connection and transmits 624 a Connection Response message. The RAN 206a transmits 626 to the UE 204a-204b an acknowledgement in response to the NAS Connection Request message in the form of an NAS Connection Establishment message indicating to the UE 204a-204b that it can start sending and receiving IP traffic.

When the UE 204a-204b sends User Plane traffic, it is routed 628, 630, 632 through the RAN 206a, the Slice Entry Point 208, and the Cache NF 210. If the content that the UE has requested is already cached in the Cache NF 210, the content is served from the Cache NF 210, as illustrated in FIG. 6, improving response times and minimizing traffic towards Internet. Otherwise, the Cache NF may route the User Plane traffic towards a final destination, which is not illustrated in this drawing.

Figure 7:
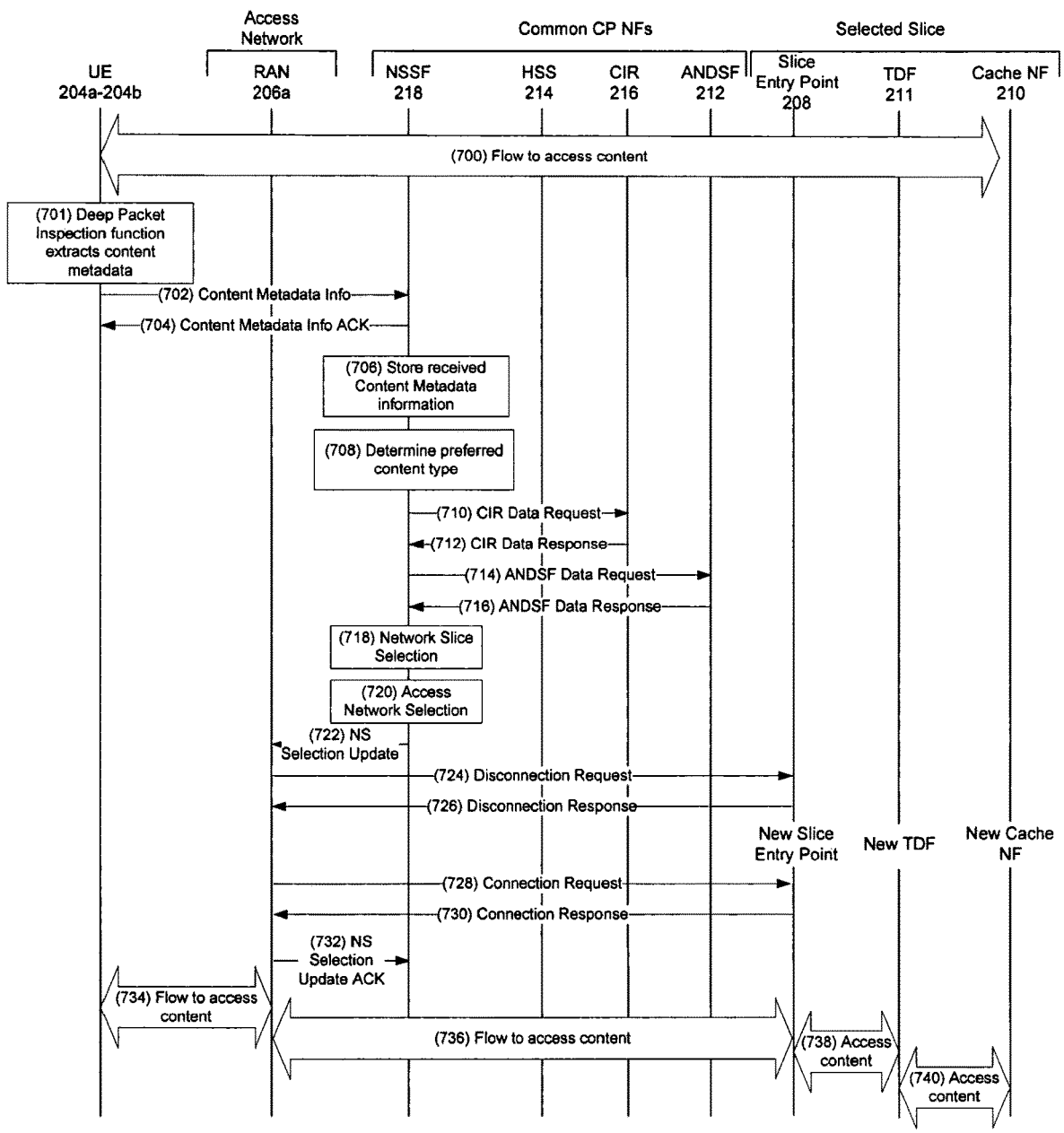
FIG. 7 is a signalling diagram showing a method for a UE establishing IP flows to access content.

The scenario illustrated in FIG. 7 assumes that the UE 204a-204b has already attached to the network and has been allocated to a particular network slice. FIG. 7 shows a signalling diagram in which the UE 204a-204b establishes some IP flows to access some given content. The UE 204a-204b may be equipped with a deep packet inspection engine that analyzes all the IP traffic generated at the UE 204a-204b and indicates to the NSSF 218 about the type of traffic the IP flows represent, so that the NSSF 218 can have enough data to perform a Network Slice reselection and Access Network selection. In this particular flow the NSSF 218 performs both Network Slice selection and Access Network selection. As a result, the NSSF decides to keep the current access network that the UE 204a-204b is using. In other methods and apparatus, the decision of the NSSF 218 may be to select a different access network 206a-206n.

The selected Network Slice 202a-202n and access network 206a-206n should provide the best user experience in terms of performance and quality of service for that given traffic.

Referring to FIG. 7, the initial state considers a UE that has an ongoing IP flow that is providing data to some given content 700. The deep packet inspection engine in the UE 204a-204b analyzes 701 the IP flow and extracts content metadata. For example, the deep packet inspection engine may determine a list of URLs that are being visited by the web browser in the UE 204a-204b, or software applications and their connections. Periodically, or when there is a sufficient amount of data to be reported, the UE 204a-204b transmits 702 a Content Metadata Info message to the NSSF 218 including the list of visited web sites or IP addresses of remote servers.

The NSSF 218 transmits 704 a message acknowledging the reception of this content metadata and stores them locally for usage as historical content metadata in the future.

The content data manager 318 of the NSSF 218, based on the received content metadata information received from the UE 204a-204b and any stored historical data for this user, determines 708 what is the preferred content type. For example, the content data manager 318 may determine that the user has started watching some video clips in a popular web site, according to his habits at this time of the day and day of the week. The cache data requester 314 then queries 710 the CIR 216 in order to determine if there is at least one Cache NF 210 that is caching the content the user is preferably accessing.

The content data controller 414 of the CIR 216 queries its database of cached content and transmits a response to the NSSF 218 in a CIR Data Response message that contains a list of network slices that are caching the preferred content. The content data controller 414 may also control the transmitter 402 to transmit the data in the Content Metadata Info message to an external database, such as the HSS 214

The network slice selector 316 NSSF removes from the list of received network slices 202a-202n those network slices that are not authorized to be used by this particular user, based on user subscription information received from the HSS 214 during the initial network selection. The access network manager 320 transmits 714 a query the ANDSF 212 in order to determine which access networks 206a-206n are available in the neighborhood of the location of the UE 204a-204b. The ANDSF 212 returns 716 in an ADNSF Data Response message a list of available access networks 206a-206n. For example, the ANDSF 212 might be aware that in the vicinity of the UE 204a-204b there are two WLAN access networks, supplied by two different service providers, and a cellular network.

With the received information from the CIR 216 and/or the ANDSF 212, the network slice selector selects 718 the best network slice 202a-202n and may also select 720 the best access network 206a-206n that is available for this user and the preferred type of content. In FIG. 7, the NSSF 218 selects another network slice 202a-202n, but determines to keep the existing access network, i.e. RAN 206a. The NSSF 218 stores this decision in its internal records for future usage.

Then the NSSF 218 transmits 722 an NS Selection Update message to the RAN 206a indicating that the UE 204a-204b should use a different network slice 202a-202n from now on. The RAN 206a then sends 724 a Disconnection Request message to the Slice Entry Point 208 of the current network slice 202a-202n in order to clear user associated states. The Slice Entry Point 208 acknowledges 726 with a Disconnection Response message. Then the RAN 206a connects 728, 730 to the new network slice 202a-202n identified in the message received at step 722 by sending a Connection Request message to the new Slice Entry Point, which acknowledges with a Connection Response.

The RAN 206a acknowledges 732 the completion of the NS Selection Update message with an NS Selection Update ACK.

Traffic 734, 736, 738, 740 generated by the UE 204a-204n is routed to the RAN 206a and from there to the new Slice Entry Point 208, to the New TDF and further to the New Cache NF 210. If the content that the user is trying to access is locally cached in the New Cache NF 210, it is served from there. Otherwise, the IP packets are forwarded to their destination.

Figure 8:
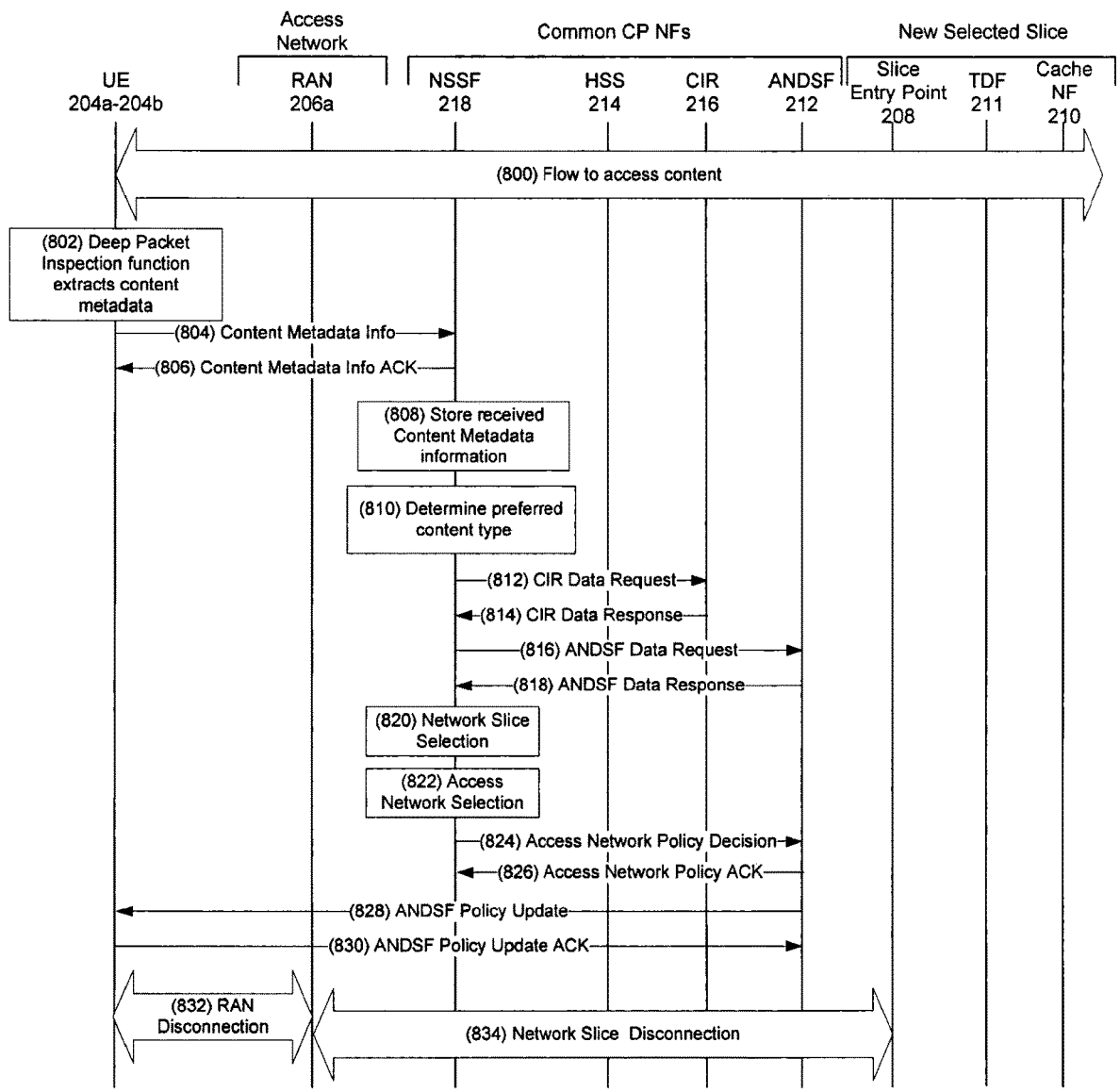
FIG. 8 is a signalling diagram showing a method for changing a network slice and a network access based on content metadata.

FIG. 8 is a signalling diagram in which the NSSF 218 decides that a different network slice 202a-202n and a different access network 206a-206n (different from the current ones) are preferable for access the content that is mostly being accessed by the user, as determined from the content metadata.

The differences with respect to FIG. 7 where the NSSF 218 decides on a different network slice 202a-202n, but keeps the current access network 206a are:

The NSSF 218 decides to select both a different access network 206a-206n and a network slice 202a-202n;

The NSSF 218 does not inform the RAN 206a of the network slice change;

The NSSF 218 instructs ANDSF 212 to send new policies to the UE 204a-204b for selecting the NSSF 218 selected access network.

The UE 204a-204b disconnects from the current RAN 206a, which provokes a disconnection from the existing network slice 202a-202n. Then the UE 204a-204b may connect a new access network 206n, and as a consequence a new network slice 202a-202n selection may be executed, leading to selection of the new network slice 202a-202n, which is the same as for an initial access and network slice selection.

According to FIG. 8, steps 800 to 822 are as steps 700 to 720 in FIG. 7. Because the access network manager 320 of the NSSF 218 decides to select both a network slice 202a-202n and a new access network 206a-206n, it controls the transmitter 302 to transmit 824 an Access Network Policy Decision message to the ANDSF 212 indicating what is the newly selected access network 206a-206n. The ANDSF 212 responds 826 and acknowledges reception of the message then transmits 828 an ANDSF Policy Update message to the UE 204a-204b in order to instruct it to select the new access network 206a-206n. The UE 204a-204b transmits 830 an acknowledgement of reception of the message and initiates a procedure 832 to disconnect from the RAN 206a. This, in turn, causes the RAN 206a to disconnect 834 from the current network slice 202a-202n.

From this point, the UE 204a-204b selects an access network that was indicated in the ANDSF Policy Update message 828, for example, a Wi-Fi access network 206n. Then the UE follows similar steps as for an initial Access Network and Network Slice selection, as described in FIG. 6. According to that figure, when it is time for the NSSF 218 to select a Network Slice (step 618), the NSSF 218 selects the same network slice 202a-202n as previously selected, due to the recorded network slice selection into the NSSF records for this user. As a consequence, the UE 204a-204b has connected to a new Wi-Fi access network 206n which has been selected by the NSSF 218. For the sake of simplicity, the NSSF 218 has selected a new network slice which coincides with the network slice that was selected in FIG. 8.

In exemplary methods and apparatus, instead of or in addition to implementing a Deep Packet Inspection engine in the UE 204a-204b, such Deep Packet Inspection engine may be implemented in a network node, such as a TDF 211. In such methods and apparatus, the TDF node is provided to report to the NSSF 218 on the type of content, services, and URLs that the user is accessing rather than this being done by the UE 204a-204b.

Figure 9:
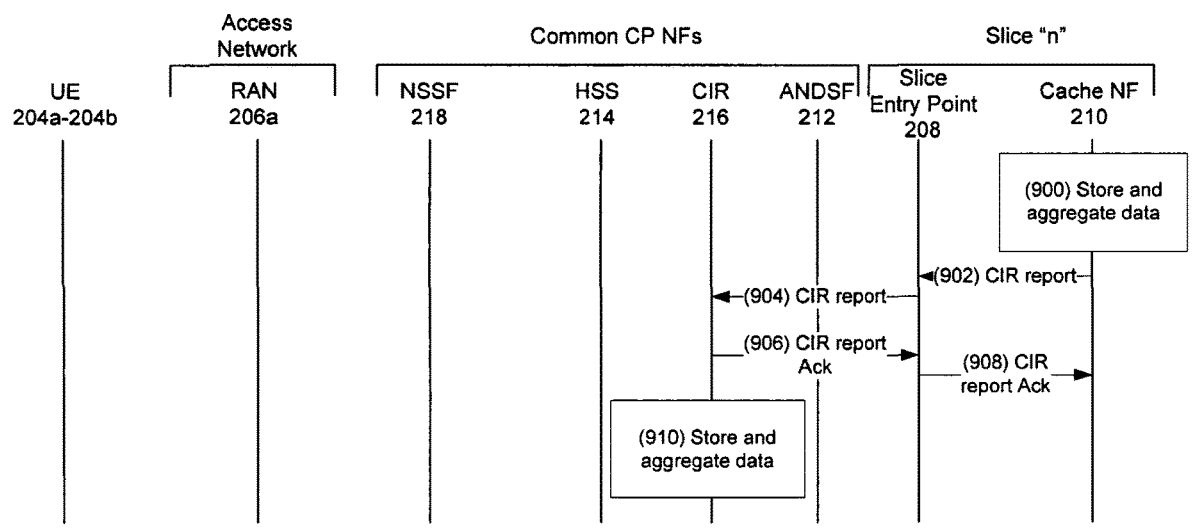
FIG. 9 is a signalling diagram showing a method for reporting content data by a Cache Network Function to a Cache Inventory Repository.

As set out above, exemplary methods and apparatus comprise a CIR 216 that acquires information from all the different Cache NFs 210 implemented in a plurality of network slices 202a-202n in order to have a holistic view of which Cache NFs 210 are storing which type of information. FIG. 9 is a signalling diagram showing reporting of content data by a Cache NF 210 to the CIR 216. The assumption is that a plurality of network slices 202a-202n contain one or more Cache NFs, each storing some type of content or some content accessible through some URLs.

Referring to FIG. 9, a cached content manager 514 in each Cache NF 210 stores 900 a list of aggregated content that is cached at the Cache NF 210. The list includes the type of content, the URLs or IP addresses of servers whose content is being cached, etc. The cached content manager 514 in each Cache NF 210 of a network slice 202a-202n periodically (e.g. from time to time, at regular intervals or triggered by one or more events) controls the transmitter 502 to transmit 902 the content data to the network slice entry point 208, which in turn transmits 904 the content data to the CIR 216. The CIR 216 transmits 906 a message acknowledging the reception of the content data to the entry point 208, which then transmits 908 a corresponding message to the Cache NF 210. The content data controller 414 of the CIR 216 aggregates and stores 910 the content data received from the plurality of Cache NFs 210, which includes the network slice 202a-202n that is caching each content.

As a result, the CIR 216 is equipped with a table that maps the type of content or URLs or list of IP addresses, to the network slices 202a-202n and Cache NFs 210 that are storing such cached content. This information is used to produce the appropriate response whenever the NSSF 218 asks for the network slices that are storing some given content type, URL, or IP address.

A computer program may be configured to provide any of the above described methods. The computer program may be provided on a computer readable medium. The computer program may be a computer program product. The computer program product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A network node for use as a Network Slice Selection Function (NSSF) in a telecommunications network, the network node being operable to select a network slice to which a User Equipment (UE) can connect in the telecommunications network, the network node comprising:
   a content data manager operable to determine, based on historical content data for the UE or based on current content requested by the UE, particular content cached in one or more network slices;
   a cache data requester operable to control a transmitter to transmit to a Cache Inventory Repository (CIR) a request for cache data indicating the particular content cached in the one or more network slices;
   a receiver operable to receive a response from the CIR comprising the cache data identifying the one or more network slices in which the particular content is cached; and
   a network slice selector operable to select a network slice to which the UE can connect, based at least in part on the received cache data identifying the one or more network slices in which the particular content is cached.

2. A network node according to claim 1, wherein the content data manager is further operable to trigger storage of the current content data for subsequent use as historical content data, the storage triggered in a local memory and/or an external database via the transmitter.

3. A network node according to claim 1, further comprising an access network manager operable to control the transmitter to transmit a request for access network data to an Access Network Discovery and Selection Function (ANDSF) indicating one or more access networks in the vicinity of the UE,
   wherein the receiver is operable to receive the access network data from the ANDSF,
   the access network manager being further operable to select an access network from the indicated one or more access networks based at least in part on the particular content.

4. A network node according to claim 3, wherein the access network manager is further operable to transmit a message to the ANDSF instructing it to effect connection of the UE to the selected access network.

5. A network node according to claim 1, wherein the receiver is further operable to receive from an access network node, a request for a network slice for use with a UE, and wherein the network slice selector is further operable to transmit a message to the access network node instructing the access network to connect the UE to the selected network slice.

6. A method for operating a network node for use as a Network Slice Selection Function (NSSF) in a telecommunications network, the network node being operable to select a network slice to which a User Equipment (UE) can connect in the telecommunications network, the method comprising:
   determining, based on historical content data for the UE or based on current content requested by the UE, particular content cached in one or more network slices;
   transmitting, to a Cache Inventory Repository (CIR), a request for cache data indicating the particular content cached in the one or more network slices;
   receiving, by a receiver, a response from the CIR comprising the cache data identifying the one or more network slices in which the particular content is cached; and
   selecting, by a network slice selector, a network slice to which the UE can connect, based at least in part on the received cache data identifying the one or more network slices in which the particular content is cached.

7. A method according claim 6, further comprising the content data manager triggering storage of the current content data for subsequent use as historical content data, the storage triggered in a local memory and/or an external database via the transmitter.

8. A method according to claim 6, further comprising an access network manager controlling the transmitter to transmit a request for access network data to an Access Network Discovery and Selection Function (ANDSF) indicating one or more access networks in the vicinity of the UE,
   receiving, by the receiver, the access network data from the ANDSF,
   selecting, by the access network manager, an access network from the indicated one or more access networks based at least in part on the particular content.

9. A method according to claim 8, further comprising the access network manager transmitting a message to the ANDSF instructing it to effect connection of the UE to the selected access network.

10. A method according to claim 6, further comprising the receiver receiving from an access network node, a request for a network slice for use with a UE,
    and the network slice selector transmitting a message to the access network node instructing the access network to connect the UE to the selected network slice.

11. A non-transitory computer-readable medium storing instructions which, when executed on at least one processor, cause the at least one processor to carry out the method according claim 6.

* * * * *